May 2, 1933.　　C. J. HALBORG ET AL　　1,907,065
DRESSING FIXTURE
Filed July 11, 1931　　2 Sheets-Sheet 2
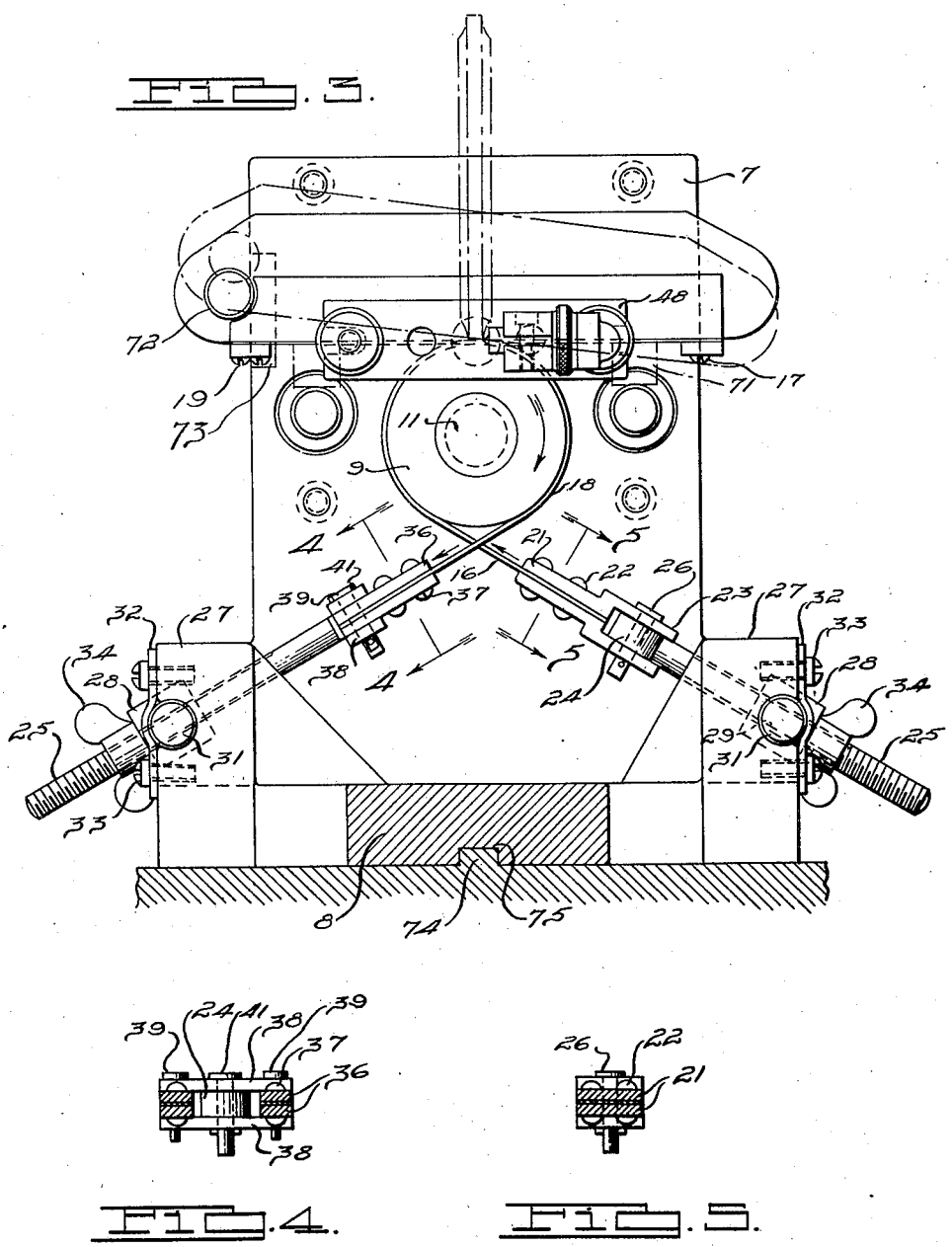
INVENTORS.
Carl J. Halborg.
Axel L. Nilsson.
BY
Harnus, Dickey, Pierce & Hann.
ATTORNEYS.

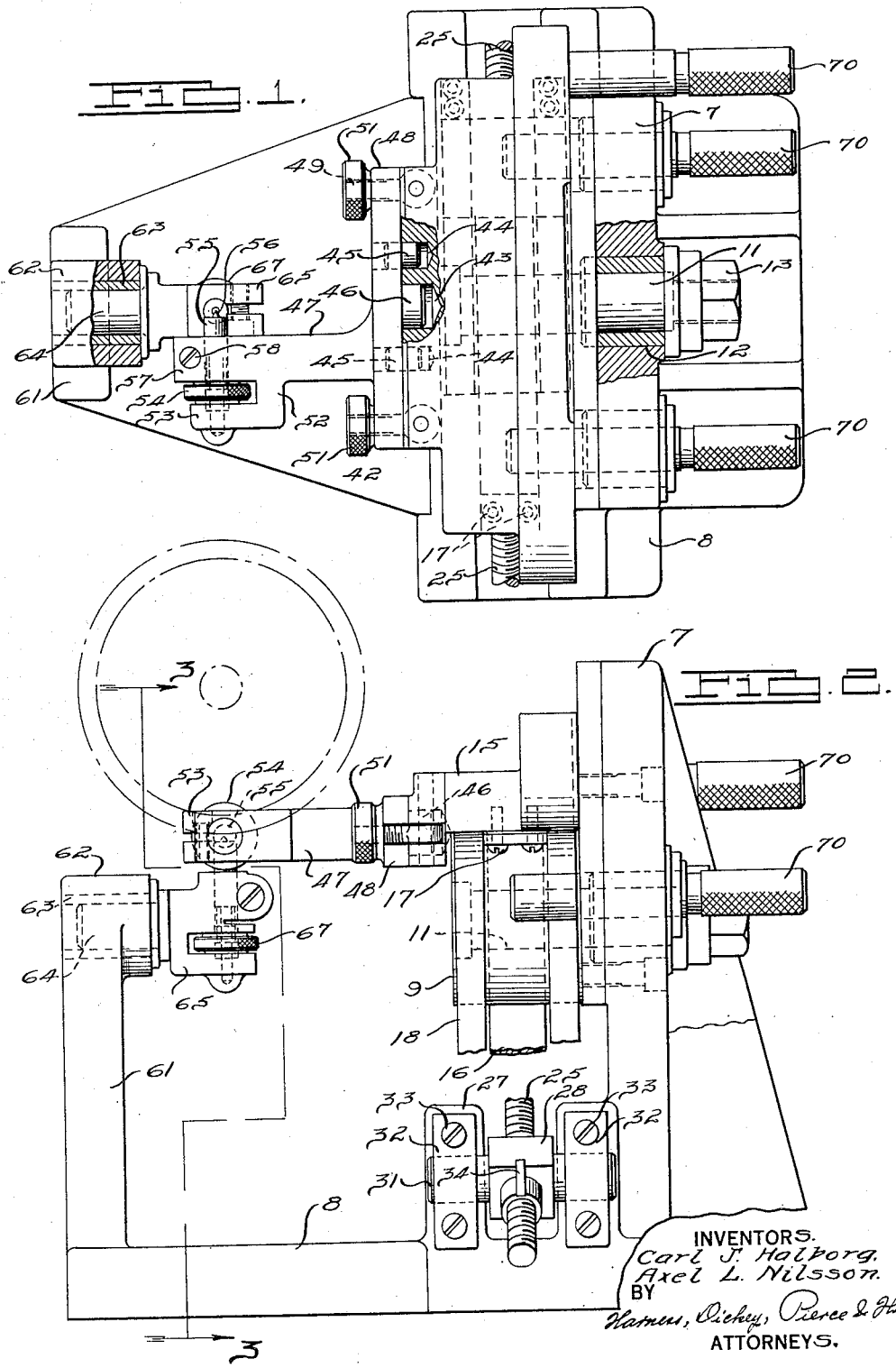

Patented May 2, 1933

1,907,065

UNITED STATES PATENT OFFICE

CARL J. HALBORG AND AXEL L. NILSSON, OF DETROIT, MICHIGAN, ASSIGNORS TO COLONIAL BROACH COMPANY, A CORPORATION OF MICHIGAN

DRESSING FIXTURE

Application filed July 11, 1931. Serial No. 550,072.

This invention relates to dressing fixtures and particularly to a fixture for dressing both sides of a grinding wheel into true involute form for finishing the sides of gear teeth.

The principal objects of the invention are: to provide a fixture with a support for a dressing tool which rocks on a cylindrical member to describe a curve of involute form on either side of a grinding wheel; to provide a dressing tool which is attachable to the support in such manner as to extend on either side of the center line through the grinding wheel; to provide a second cutting tool in vertical alignment with the first said cutting tool for dressing the periphery of the grinding wheel; and of providing adjustable means whereby the support for the cutting tool may be accurately positioned relative to the cylindrical member upon which it is supported.

Other objects and features of novelty of our invention will be either specifically pointed out or will become apparent when referring, for a better understanding of our invention, to the following description in conjunction with the accompanying drawings, wherein:

Figure 1 is a plan view of a dressing fixture embodying features of our invention, Figure 2 is a side view of the structure illustrated in Figure 1, Figure 3 is a sectional view of the structure illustrated in Figure 2, taken on the line 3—3 thereof, Figure 4 is a sectional view of the structure illustrated in Figure 3, taken on the line 4—4 thereof, and Figure 5 is a sectional view of the structure illustrated in Figure 3, taken on the line 5—5 thereof.

After teeth of involute form have been generated on a gear blank, the gear thus machined is heat treated for the purpose of hardening the teeth a predetermined amount so as to withstand the wear and shock to which they are subjected in service. The hardening operation releases the stresses in the metal of the gear which causes the teeth to be warped or slightly distorted from a true tooth form. We propose to grind the sides of the teeth into accurate involute form by passing a grinding wheel longitudinally across the adjacent surface of two teeth to grind the adjacent sides thereof to accurate shape by a single longitudinal passage of the grinding wheel therebetween. In order to grind the teeth in this manner, it is necessary to accurately dress the sides of the grinding wheel at the peripheral edge thereof into true involute form. The present invention relates to the structure for, and the method of, effecting the dressing operation on the grinding wheel.

Referring to the drawings, we have illustrated a face plate 7 which is supported on a grinding machine through the medium of a base portion 8 which constitutes a horizontal extension of the face plate 7. A cylindrical shaped member 9 having a diameter slightly less than that of the base circle from which the involute form of gear tooth was generated, is rotatably supported by a bolt 11 which is journaled in a bearing 12 in the face plate 7. Suitable clamping means 13 engage the rear end of the bolt 11 for supporting the bolt on the face plate so that the member 9 may rotate.

Positioned above the cylindrical member 9, a tool supporting member 15 is provided, having a wide central band 16 supported centrally on one end thereof by bolts 17 and having a pair of bands 18 disposed on either side of the band 16 and attached to the opposite end of the member by bolts 19. The wide band 16 extends laterally to the left, with reference to the structure illustrated in Fig. 3, along the bottom surface of the member 15 and about the periphery of the member 9, from which the end extends to the right. The end, as illustrated in Figure 5, has two oppositely disposed members 21 attached thereto by rivets 22 to provide a bifurcated end 23 for receiving the eye 24 of the bolt 25 through which a pin 26 extends for retaining the bolt as an extension of the band 16.

The base portion 8 is provided with a pair of spaced standards 27 on each of its sides, as illustrated in Figures 2 and 3, for receiving trunnioned blocks 28 which are pivotally supported thereby when retained in the aperture 31 thereof by plates 32 which are attached to the standards 27 by bolts 33. A thumb nut 34 is screwed upon the threaded end of the bolt 25 for applying a tension to the band 16.

The bands 18 extend from the left end of the member 15 across the under surface thereof and about the cylindrical member 9 and then to the left as viewed in Figure 3. Each of the ends of the bands 18 have a pair of plates 36 attached thereto by rivets 37, and are spanned by bridging bars 38 which are attached thereto by pins 39. The central space between the bridging bars receives the eye 24 of the bolt 25 which is attached thereto by a pin 41. A thumb nut 34 is threaded on the bolt 25 through the block 28 for tensioning the bands 18.

By adjusting the position of the bands 16 and 18, through the adjustment of the thumb nuts 34, the tool supporting member 15 may be moved laterally relative to the cylindrical member 9 to have a point which is tangent to the upper surface of the bands fall upon the center line of the wheel to be dressed. The rolling of the member 15 on the bands 16 and 18 about the member 9 to describe an involute curve is effected by the relative winding and unwinding of the bands on the member 9 as the member 15 is tilted in one direction and the reverse winding and unwinding of the bands when the member 15 is tilted in the other direction.

The member 15 is provided with a frontwardly projecting flange portion 42 having a large central aperture 43 and two adjacent apertures 44 of smaller diameter for receiving an enlarged central pin 46 and adjacent pins 45, respectively, provided on the attachment 47. Slots 48 are provided in the ends of the attachment 47 through which the body portions of pivoted eye bolts 49 may be inserted for quickly clamping the supporting member 47 on the projecting flange 42 by the adjustment of thumb nuts 51.

The supporting member 47 is provided with an outwardly projecting arm 52 having a bifurcated end 53 in which a thumb nut 54 is mounted, attached to threads of a rod 55 which supports a diamond 56 in its end for contacting with a wheel to be dressed. A portion 57 of the bifurcated end 53 is slotted horizontally and provided with a screw 58 for drawing the sides of the slots together for clamping the rod 55 in fixed relation to the arm 52. When adjustment is to be made to the diamond laterally of the arm, the screw 58 is first loosened and the longitudinal adjustment of the diamond effected through the movement of the thumb nut 54 after which the screw 58 is tightened to draw the two sides of the portion 57 into clamped relation.

A standard 61 projects upwardly from the end of the base portion 8 opposite to that from which the face plate 7 extends and is provided with a boss 62 on its upper end having a bearing 63 therein for receiving a stub shaft 64 projecting from the end of a tool holder 65. The tool of the holder 65 is in the nature of a diamond mounted in a rod similar to the rod and diamond hereinabove referred to and is supported in a bifurcated end of the holder 65 and adjusted by a thumb screw 67 in the same manner as the adjustment of the dressing tool 56 is accomplished with reference to its relation to the supporting member 47. The tool is aligned centrally of the base portion 8 and is rotated through an arc to dress a concaved arcuate surface on the periphery of the grinding stone.

We have provided a plurality of adjusting plugs 70 which are insertable through the face plate 7 to project frontwardly thereof for the purpose of gauging the position of the tool supporting member 15 relative to the cylindrical member 9. Adjusting blocks 71, shown in dot and dash line in Figure 3, may be positioned between the frontwardly extending ends of the plugs and the member 15 for horizontally positioning the member. The plug 70 on the left hand end of the member 15 which is supported in the aperture 72 thereof, positions the member 15 laterally through the engagement of the plug with an engaging block 73 provided in the side of the face plate 7. When the member 15 is positioned horizontally and laterally in this manner, the thumb screws 34 are tightened and after the plugs 70 are removed the fixture is adjusted to describe true involute curves.

The thickness of the bands 16 and 18 are such that the diameter across the cylindrical member 9 and the band when wound therabout is equal to the base circle from which the involute tooth form of the gear has been generated and it is very evident that the member 15 will have a point thereon which will generate the same involute form when the member 15 is rolled on the cylindrical member 9. The thumb nut 54 on the tool supporting member 47 is adjusted to have the dressing diamond 56, on the tool 55, coincide with this point so that the cutting edge of the diamond will follow the involute form of curve generated by the rolling of the member 15 on the cylinder 9.

When it is necessary to dress the grinding wheel the fixture is placed upon the bed of the grinding machine, preferably in contact with a rail 74 thereof which engages a slot 75 in the base portion 8, to position the fixture relative to the wheel. The grinding wheel is rotated and, when the diamond is positioned on the right of the wheel as illustrated in Figure 3, the member 15 is rocked clockwise to have the point of the diamond 56 describe an involute curve on the side edge of the grinding wheel. It is to be understood that the grinding wheel is adjusted vertically until it contacts with the diamond after which the member 15 is rotated relative to the speed of the wheel to dress the involute shape on one of its sides.

The thumb nuts 51 are then loosened and the bolts 49 swung out of the slots 48 to permit the member 47 to be moved outwardly from the extension 42 and be revolved 180 degrees and again replaced on the member 42 and clamped thereon through the medium of the bolts 49 and the thumb nuts 51. The grinding wheel is again rotated and the member 15 is slowly rolled in a counter-clockwise direction to generate the involute form on the opposite side of the wheel.

The periphery of the wheel is then dressed through the rotation of the tool holder 65, after the diamond thereof has been adjusted relative to the first said diamond by the thumb nut 67, to dress an arcuate surface on the periphery of the wheel similar to that generated between the teeth of the gear. The adjustment of the diamond of the tool holder 65 is such as to procure the proper width between the two side edges of the wheel which have been dressed to involute form. After the wheel has been dressed in this manner the fixture may be removed from the machine and the wheel may be passed between the gaps of the teeth of the gear to dress the sides of adjacent teeth into true involute form.

It is to be understood that the fixture may be positioned in fixed relation to the bed of the machine when the upper edge thereof is employed for grinding the sides of the teeth or the fixture may be inverted and suspended above the wheel when the lower part of the wheel is employed for dressing the gear teeth. In like manner the fixture may be positioned on the bed plate to slide rearwardly of the wheel on the rail 74 and be moved into dressing position when needed, to thereby eliminate the necessity for removing the fixture each time the wheel is to be dressed.

While we have described and illustrated but a single embodiment of our invention, it will be apparent to those skilled in the art that various changes, omissions, additions and substitutions may be made therein without departing from the spirit and scope of our invention, as set forth in the accompanying claims.

We claim as our invention:

1. A fixture for dressing a grinding wheel which includes, in combination, a face plate having a cylindrical member mounted thereon for rotational movement, a tool supporting element mounted tangentially of said member, bands extending across the bottom surface of said element in opposite directions and positioned about opposite sides of said member, adjustable anchoring means for said ends independent of said cylinder member and said supporting element, and a dressing tool mounted on said element in such manner as to describe an involute curve when said element is rolled on said cylindrical member.

2. A fixture for dressing a grinding wheel which includes, in combination, a face plate having a rotatable cylindrical member plate having a rotatable cylindrical member mounted thereon, a tool supporting element having bands extending across the bottom surface thereof and mounted tangentially of said member, said bands extending in opposite directions about opposite sides of said member, adjustable anchoring means for said ends independent of said cylinder member and said supporting element, a dressing tool mounted on said element for describing an involute curve when the element is rolled in one direction, and means for adjusting said tool whereby it generates an involute curve on the opposite side of said wheel when the element is rolled in a reverse direction.

3. A fixture for dressing a grinding wheel which includes, in combination, a face plate having a cylindrical member mounted thereon for rotational movement, a tool supporting element mounted tangentially of said member, bands extending across the bottom surface of said element in opposite directions and positioned about opposite sides of said member, adjustable anchoring means for said ends independent of said cylinder member and said supporting element, a dressing tool, mountable to project toward either side of said wheel for dressing involute curves on the sides thereof, and a second tool supported for arcuate movement in a plane through the axis of the grinding wheel.

4. A fixture for dressing a grinding wheel which includes, in combination, a face plate having a cylindrical member mounted thereon for rotational movement, a tool supporting element mounted tangentially of said member, bands extending across the bottom surface of said element in opposite directions and positioned about opposite sides of said member, adjustable anchoring means for said ends independent of said cylinder member and said supporting element, a dressing tool, a support for said tool attachable to said element to have the tool project toward either side of said wheel for dressing involute curves on the sides thereof, and a second dressing tool positioned to dress the edge of the wheel relative to the dressed sides thereof.

5. A fixture for dressing a grinding wheel which includes, in combination, a face plate having a cylindrical member mounted thereon for rotational movement, a tool supporting element mounted tangentially of said member, bands extending across the bottom surface of said element in opposite directions and positioned about opposite sides of said member, adjustable anchoring means for said ends, and means for supporting said tool supporting element in predetermined position while said anchoring means is adjusted to tighten said bands and retain said element in predetermined position on said cylindrical member.

In testimony whereof we affix our signatures.

CARL J. HALBORG.
AXEL L. NILSSON.